Figure 1:
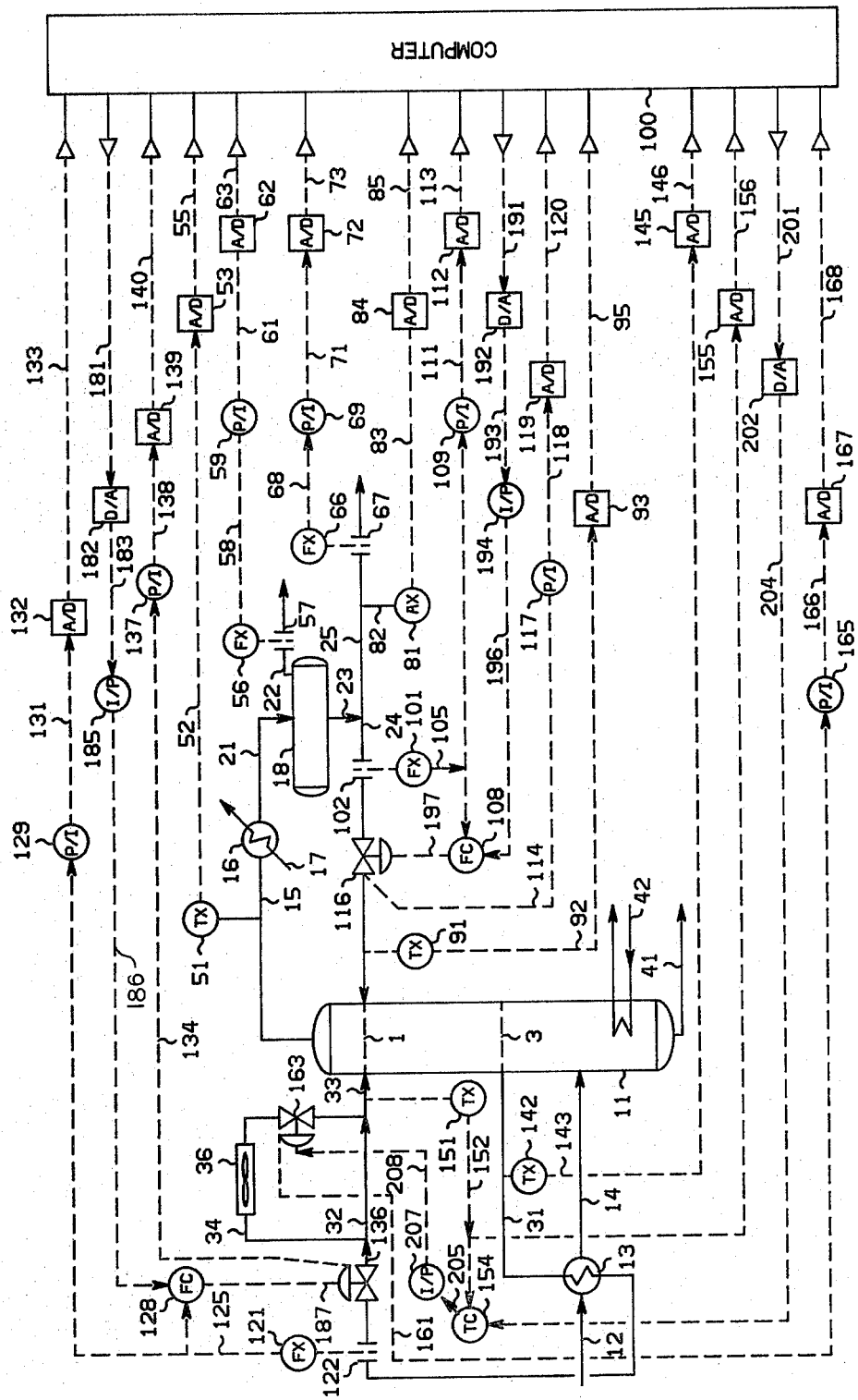

United States Patent [19]

Furr

[11] 4,295,196

[45] Oct. 13, 1981

[54] FRACTIONAL DISTILLATION COLUMN CONTROL

[75] Inventor: Danny L. Furr, Broken Arrow, Okla.

[73] Assignee: Phillips Petroleum Company, Bartlesville, Okla.

[21] Appl. No.: 165,463

[22] Filed: Jul. 2, 1980

[51] Int. Cl.³ .............................................. E01D 3/42
[52] U.S. Cl. ................................. 364/501; 196/132; 202/160; 202/206; 203/DIG. 18
[58] Field of Search .................. 203/1, 2, 3, DIG. 18; 364/501; 196/132; 62/21, 37; 202/160, 206

[56] References Cited

U.S. PATENT DOCUMENTS

| | | | |
|---|---|---|---|
| 3,392,088 | 7/1968 | Johnson | 203/1 |
| 3,463,725 | 8/1969 | MacFarlane et al. | 203/DIG. 18 |
| 4,166,770 | 9/1979 | Anderson et al. | 203/2 |
| 4,238,212 | 12/1980 | Anderson | 203/DIG. 18 |

Primary Examiner—Frank Sever

[57] ABSTRACT

In a fractionation distillation process in which a pump around stream and an external reflux are utilized to control heat removal from an upper portion of the fractional distillation column and in which the pump around stream is utilized to preheat the feed stream flowing to the fractional distillation, the flow rate of the pump around stream is manipulated so as to substantially maximize the flow rate of the pump around stream while maintaining a desired heat removal from the fractional distillation column. Priority control of the pump around stream and external reflux result in a maximum preheating of the feed stream flowing to the fractional distillation column which improves the energy efficiency of the fractional distillation process.

3 Claims, 1 Drawing Figure

FRACTIONAL DISTILLATION COLUMN CONTROL

This invention relates to control of a fractional distillation column. In one aspect this invention relates to method and apparatus for maintaining a desired internal reflux flow rate in a fractional distillation column. In another aspect this invention relates to method and apparatus for improving the energy efficiency of a fractional distillation column while maintaining a desired internal reflux flow rate in the fractional distillation column.

Heat is commonly added to a fractional distillation column through a fired reboiler heater or by circulating a heated fluid through the lower portion of the fractional distillation column. Heat is commonly removed from the fractional distillation column by overhead condensers. In some fractional distillation columns, closer control of the heat removal from the fractional distillation column is accomplished by using a combination of overhead condensers and a pump around stream which is withdrawn from the side of the fractional distillation column, circulated through a cooler, and returned to the fractional distillation column.

The amount of heat removed from a fractional distillation column directly determines the internal reflux flow rate. The internal reflux flow rate must be maintained at a desired level to obtain products which meet predetermined specifications. It is thus necessary to closely control the heat removal from the fractional distillation column if desired product specifications are to be obtained.

As has been previously stated, the pump around stream is generally circulated through a cooler prior to returning to the fractional distillation column. The feed stream flowing to the fractional distillation column may be passed through the cooler and in this way the pump around stream is cooled while the feed stream is heated. This reduces the heat that must be supplied to the fractional distillation column through a fired reboiler heater or a heated fluid which is circulated through a lower portion of the fractional distillation column and thus improves the energy efficiency of the fractional distillation process.

It is thus an object of this invention to provide method and apparatus for maintaining a desired internal reflux flow rate in a fractional distillation column so as to obtain desired product specifications. It is another object of this invention to improve the energy efficiency of the fractional distillation process by substantially maximizing the flow rate of the pump around stream while maintaining a desired internal reflux flow rate in the fractional distillation column.

In accordance with the present invention method and apparatus are provided whereby the flow rate of a pump around stream that is utilized to preheat the feed stream flowing to the fractional distillation column is controlled so as to substantially maximize the flow rate of the pump around stream while maintaining a desired internal reflux flow rate. This results in a maximum preheating of the feed stream flowing to the fractional distillation column which improves the energy efficiency of the fractional distillation process.

If it is desired to increase the internal reflux flow rate in the fractional distillation column and the flow rate of the pump around stream cannot be increased, the flow rate of the external reflux from an overhead accumulator is increased to maintain the desired internal reflux flow rate. If the external reflux from the overhead accumulator is flowing at a maximum flow rate and it is still desired to increase the internal reflux flow rate, then the pump around stream may be diverted through a second cooler to increase the internal reflux flow rate.

If the pump around stream is being diverted through the second cooler and it is desired to decrease the internal reflux flow rate then the diversion of the pump around stream through the second cooler is first terminated. If it is desired to further decrease the internal reflux flow rate the flow rate of the external reflux from the overhead condenser is then decreased. Only when the flow rate of the external reflux from the overhead condenser has reached a desired minimum will the flow rate of the pump around stream be reduced.

Other objects and advantages of the invention will be apparent from the foregoing brief description of the invention and the claims as well as from the detailed description of the drawing in which:

FIG. 1 is an illustration of a fractional distillation column and the associated control system of the present invention.

The invention is illustrated and described in terms of a crude oil distillation column in which crude oil is fractionated. However, the invention is applicable to any fractional distillation column in which a combination of overhead condensers and a pump around stream is utilized to provide heat removal from a fractional distillation column.

The measurements of flow rates, pressures or valve positions will generally be in pneumatic form while the measurement of a temperature will generally be in electrical form. Transducers are thus utilized in the present invention to convert pneumatic signals to electrical or electrical to pneumatic. However, if desired, the entire system could be implemented utilizing only electrical.

Although the invention is illustrated and described in terms of a specific fractionation column and a specific control system for the fractionation column, the invention is also applicable to different types and configurations of fractionation columns as well as different types of control system configurations which accomplish the purpose of the invention. Lines designated as signal lines in the drawings are electrical or pneumatic in this preferred embodiment. However, the invention is also applicable to mechanical, hydraulic or other signal means for transmitting information. In almost all control systems some combination of these types of signals will be used. However, use of any other type of signal transmission, compatible with the process and equipment in use is within the scope of the invention.

A digital computer is used in the preferred embodiment of this invention to calculate the required control signals based on measured process parameters as well as set points supplied to the computer. Other types of computing devices could also be used in the invention. The preferred computer is the OPTROL 7000 process computer system manufactured by Applied Automation, Inc., Bartlesville, Okla.

The controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is with the scope of the invention.

The operation of proportional-integral controllers is well known in the art. The output control signal of a proportional-integral controller may be represented as $$S = K_1 E + K_2 \int E dt$$

where
S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired flow rate and an actual flow rate are compared by a controller. The output could be a signal representative of a desired change in the flow rate of some fluid necessary to make the desired and actual flow rates equal. On the other hand, the same output signal could be scaled to represent a percentage or could be scaled to represent a temperature change required to make the desired and actual flow rates equal. If the controller output can range from 3 to 15 psi, which is typical, then the output signal could be scaled so that an output signal having a pressure of 9 psi, corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11 which is utilized to fractionate a crude oil feed into a variety of products. For the sake of simplicity, only the overhead vapor product, light naphtha product and bottoms product are illustrated in FIG. 1. The crude oil feed is supplied to the fractional distillation column 11 through the combination of conduit means 12, heat exchanger 13 and conduit means 14.

An overhead stream is withdrawn from the fractional distillation column 11 through conduit means 15 and is provided to the heat exchanger 16. The heat exchanger 16 is provided with a cooling medium flowing through conduit means 17. The partially condensed fluid stream from the heat exchanger 16 is provided to the overhead accumulator 18 through conduit means 21. The portion of the fluid stream flowing through conduit means 21 which remains in vapor form is withdrawn from the overhead accumulator 18 through conduit means 22 as a fuel gas. The liquid portion of the fluid stream flowing through conduit means 21 is withdrawn from the accumulator 18 through conduit means 23. The fluid flowing through conduit means 23 is provided as an upper external reflux to the fractional distillation column 11 through the combination of conduit means 23 and 24. The fluid flowing through conduit means 23 is also provided as the light naphtha product from the fractional distillation column 11 through the combination of conduit means 23 and 25.

The fractional distillation column 11 contains a plurality of trays of which only trays 1 and 3 are illustrated. A top pump around stream is withdrawn from tray 3 of the fractional distillation column and is provided through conduit means 31 to the heat exchanger 13. The top pump around stream flows through the heat exchanger 13 and is then returned to the fractional distillation column 11. The returning top pump around stream may be returned directly to the fractional distillation column through the combination of conduit means 31, 32 and 33 or may be at least partially diverted through conduit means 34 and then returned through conduit means 33. An air cooler 36 is operably located in conduit means 34 and can be utilized to provide cooling to the top pump around stream returning to the fractional distillation column 11.

A bottom stream generally containing reduced crude is withdrawn from the fractional distillation column 11 through conduit means 41. Heat is supplied to the fractional distillation column 11 by heating fluid flowing through conduit means 42.

A number of other streams would generally be withdrawn from or provided to a fractional distillation column which is utilized to separate crude oil into various components. For the sake of simplicity, these streams have not been illustrated in FIG. 1. Also, the many pumps, additional heat exchangers, additional control components and other typical fractional distillation column equipment have not been illustrated for the sake of simplicity.

Temperature transducer 51 in combination with a temperature measuring device such as a thermocouple, which is operably located in conduit means 15, provides an output signal 52 which is representative of the temperature of the fluid flowing through conduit means 15. Signal 52 is provided from the temperature transducer 51 as an input to the analog to digital (A/D) converter 53. Signal 52 is converted from analog form to digital form and is provided as signal 55 to computer means 100.

Flow transducer 56 in combination with flow sensor 57, which is operably located in conduit means 22, provides an output signal 58 which is representative of the flow rate of the fuel gas flowing through conduit means 22. Signal 58 is in pneumatic form and is thus provided from the flow transducer 56 to the pneumatic to electrical (P/I) converter 59. Signal 58 is converted from pneumatic form to electrical form and is provided as signal 61 to the A/D converter 62. Signal 61 is converted from analog form to digital form and is provided as signal 63 to computer means 100.

Flow transducer 66 in combination with flow sensor 67, which is operably located in conduit means 25, provides an output signal 68 which is representative of the flow rate of the light naphtha flowing through conduit means 25. Signal 68 is in pneumatic form and is thus provided from the flow transducer 66 to the P/I converter 69. Signal 68 is converted from pneumatic form to electrical form and is provided as signal 71 to the A/D converter 72. Signal 71 is converted from analog form to digital form and is provided as signal 73 to computer means 100.

End point analyzer 81 is connected to conduit means 25 through conduit means 82. A sample of the light naphtha product flowing through conduit means 25 is provided through conduit means 82 to the end point analyzer 81. The sample is preferably heated in the end point analyzer 81 until 90 percent of the sample is vapor. Signal 83 is representative of the temperature required to vaporize 90 percent of the sample. Signal 83 is provided from the end point analyzer 81 to the A/D converter 84. Signal 83 is converted from analog form to digital form and is provided as signal 85 to computer means 100. Obviously other types of analyzers could be utilized to control the product specification of the light naphtha product. Also different end points could be utilized if desired.

Temperature transducer 91 in combination with a temperature measuring device such as a thermocouple, which is operably located in conduit means 24, provides an output signal 92 which is representative of the temperature of the upper external reflux flowing through conduit means 24. Signal 92 is provided from the temperature transducer 91 to the A/D converter 93. Signal 92 is converted from analog form to digital form and is provided as signal 95 to computer means 100.

Flow transducer 101 in combination with the flow sensor 102, which is operably located in conduit means 24, provides an output signal 105 which is representative of the flow rate of the upper external reflux flowing through conduit means 24. Signal 105 is provided as an input to the flow controller 108 and is also provided as an input to the P/I transducer 109. Signal 105 is converted from pneumatic form to electrical form and is provided as signal 111 to the A/D converter 112. Signal 111 is converted from analog form to digital form and is provided as signal 113 to computer means 100.

Signal 114, which is representative of the position of the pneumatic control valve 116 which is operably located in conduit means 24, is provided as an input to the P/I transducer 117. Signal 114 is converted from pneumatic form to electrical form and is provided as signal 118 from the P/I transducer 117 to the A/D converter 119. Signal 118 is converted from analog form to digital form and is provided as signal 120 to computer means 100.

Flow transducer 121 in combination with the flow sensor 122, which is operably located in conduit means 31, provides an output signal 125 which is representative of the flow rate of the upper external reflux flowing through conduit means 31. Signal 125 is provided as an input to the flow controller 128 and is also provided as an input to the P/I transducer 129. Signal 125 is converted from pneumatic form to electrical form and is provided as signal 131 to the A/D converter 132. Signal 131 is converted from analog form to digital form and is provided as signal 133 to computer means 100.

Signal 134, which is representative of the position of the pneumatic control valve 136 which is operably located in conduit means 31, is provided as an input to the P/I transducer 137. Signal 134 is converted from pneumatic form to electrical form and is provided as signal 138 from the P/I transducer 137 to the A/D converter 139. Signal 138 is converted from analog form to digital form and is provided as signal 140 to computer means 100.

Temperature transducer 142 in combination with a temperature measuring device such as a thermocouple, which is operably located in conduit means 31, provides an output signal 143 which is representative of the temperature of the top pump around stream flowing through conduit means 31. Signal 143 is provided from the temperature transducer 142 as an input to the A/D converter 145. Signal 143 is converted from analog form to digital form and is provided as signal 146 to computer means 100.

Temperature transducer 151 in combination with a temperature measuring device such as a thermocouple, which is operably located in conduit means 33, provides an output signal 152 which is representative of the temperature of the top pump around stream flowing through conduit means 33. Signal 152 is provided as an input to the temperature controller 154 and is also provided as an input to the A/D converter 155. Signal 152 is converted from analog form to digital form and is provided as signal 156 to computer means 100.

Signal 161, which is representative of the position of the pneumatic control valve 163 which is operably located in conduit means 34, is provided as an input to the P/I transducer 165. Signal 161 is converted from pneumatic form to electrical form and is provided as signal 166 to the A/D converter 167. Signal 166 is converted from analog form to digital form and is provided as signal 168 to computer means 100.

In response to the described input signals, computer means 100 calculates the flow rate of the internal reflux in the upper portion of the fractional distillation column 11. A set point for the flow rate of the internal reflux in the upper portion of the fractional distillation column 11 is calculated by comparing the actual 90 percent end point of the light naphtha product to the desired 90 percent end point of the light naphtha product. The set point for the flow rate of the internal reflux in the upper portion of the fractional distillation column 11 is then compared to the calculated flow rate of the internal reflux in the upper portion of the fractional distillation column 11 to determine if the flow rate of the internal reflux needs to be increased or decreased. If the flow rate of the internal reflux needs to be increased, first priority is given to more fully opening the pneumatic control valve 136 so as to increase the flow rate of the pump around stream. If the flow rate of the pump around stream cannot be increased then second priority is given to more fully opening the pneumatic control valve 116 so as to increase the flow rate of the external reflux. If the flow rate of the external reflux cannot be increased then third priority is given to at least partially opening the pneumatic control valve 163 so as to divert at least a portion of the pump around stream through the air cooler 36. In this manner, the flow rate of the internal reflux is increased while insuring that the maximum utilization of the pump around stream to heat the feed stream flowing to the fractional distillation column 11 is made.

If it is desired to decrease the flow rate of the internal reflux in the upper portion of the practional distillation column 11, then first priority is given to closing the pneumatic control valve 163. If the pneumatic control valve 163 is fully closed then second priority is given to at least partially closing the pneumatic control valve 116. If the flow rate of the external reflux has reached a low limit and the flow rate of the internal reflux in the upper portion of the fractional distillation column 11 needs to be decreased still further then third priority is given to at least partially closing the pneumatic control valve 136 so as to decrease the flow rate of the pump around stream. In this manner the flow rate of the internal reflux is decreased while again assuring that maximum utilization of the pump around for heating the feed stream flowing to the fractional distillation column 11 is made.

The three output control signals provided from computer means 100 and their utilization is as follows. Signal 181, which is representative of the desired flow rate of the pump around stream flowing through conduit means 31, is provided from computer means 100 as an input to the digital to analog (D/A) converter 182. Signal 181 is converted from digital form to analog form and is provided as signal 183 to the current to pressure (I/P) transducer 185. Signal 183 is converted from electrical form to pneumatic form and is provided as signal 186 to the flow controller 128. The flow controller 128 provides an output signal 187 which is responsive to the difference between signals 186 and 125. Signal 187 is provided from the flow controller 128 to the pneumatic control valve 136. The pneumatic control valve 136 is manipulated in response to signal 187 to thereby maintain the actual flow rate of the pump around stream flowing through conduit means 31 substantially equal to the desired flow rate of the pump around stream flowing through conduit means 31.

Signal 191, which is representative of the desired flow rate of the external reflux flowing through conduit means 24, is provided from the computer means 100 as an input to the D/A converter 192. Signal 191 is converted from digital form to analog form and is provided as signal 193 to the I/P transducer 194. Signal 193 is converted from electrical form to pneumatic form and is provided as signal 196 to the flow controller 108. The flow controller 108 provides an output signal 197 which is responsive to the difference between signals 196 and 105. Signal 197 is provided from the flow controller 108 to the pneumatic control valve 116. The pneumatic control valve 116 is manipulated in response to signal 197 to thereby maintain the actual flow rate of the external reflux flowing through conduit means 24 substantially equal to the desired flow rate for the external reflux flowing through conduit means 24.

Signal 201, which is representative of the desired temperature of the pump around stream flowing through conduit means 33, is provided as an output from the computer means 100 to the D/A converter 202. Signal 201 is converted from digital form to analog form and is provided as signal 204 to the temperature controller 154. The temperature controller 154 provides an output signal 205 which is responsive to the difference between signals 152 and 204. Signal 205 is provided from the temperature controller 154 to the I/P transducer 207. Signal 205 is converted from electrical form to pneumatic form and is provided as signal 208 to the pneumatic control valve 163. The pneumatic control valve 163 is manipulated in response to signal 208 so as to maintain the actual temperature of the pump around stream flowing through conduit means 33 substantially equal to the desired temperature for the pump around stream flowing through conduit means 33.

The flow rate of the internal reflux in the upper portion of the fractional distillation column 11 is given by $$RITOP = (F_{15})(HVTOP - HVT_2)/HVT_1 + (F_{31})(CTPA/HVT_1)(T_{31} - T_{33}) + (F_{24})(HVR/HVT_1)(1 + (-KCTR)(T_{15} - T_{24})) \quad (I)$$

where:
$RITOP$ = flow rate of the internal reflux in the upper portion of the fractional distillation column 11;
$F_{15}$ = flow rate of the overhead stream flowing through conduit means 15 (summation of flow rate through conduit means 22, 24 and 25);
$F_{24}$ = flow rate of the upper external reflux flowing through conduit means 24;
$F_{31}$ = flow rate of the pump around stream flowing through conduit means 31;
$T_{31}$ = temperature of the pump around stream flowing through conduit means 31;
$T_{33}$ = temperature of the pump around stream flowing through conduit means 33;
$T_{15}$ = temperature of the overhead stream flowing through conduit means 15;
$T_{24}$ = temperature of the upper external reflux flowing through conduit means 24;
$HVTOP$ = enthalpy of the overhead stream flowing through conduit means 15;
$HVT_2$ = enthalpy of the vapor at the tray immediately below tray 3 of the fractional distillation column 11;
$HVT_1$ = heat of vaporization at tray 1 of the fractional distillation column 11;
$HVR$ = heat of vaporization of the upper external reflux flowing through conduit means 24;
$KCTR$ = the ratio of the heat capacity to the heat of vaporization of the upper external reflux flowing through conduit means 24; and
$CTPA$ = the heat capacity of the pump around stream flowing through conduit means 31.

The values of $F_{15}$, $F_{31}$, $T_{31}$, $T_{33}$, $F_{24}$, $T_{15}$ and $T_{24}$ utilized in equation (I) are measured. The heat of vaporization of a particular fluid is determined by the difference between the enthalpy of the liquid portion of the fluid and the enthalpy of the vapor portion of the fluid. Thus, it is necessary to calculate the enthalpy of both the liquid portion and vapor portion of a fluid to calculate the heat of vaporization.

A plurality of methods are available for calculating the various enthalpys required to solve equation (I). The most common method is to utilize the specific gravity of the stream and the temperature of the stream to directly derive the enthalpy from a set of standard curves. A set of standard curves which may be utilized is the "Heat Content of Petroleum Fractions" curves illustrated at FIG. 5-3 of *Petroleum Refinery Engineering* by W. L. Nelson, Fourth Edition, McGraw-Hill, 1958. Correction factors for pressure and UOPK are also available for these curves. In the present invention, the temperature of a specific stream or portion of a stream is utilized to calculate the enthalpy in Btu's per barrel. In each case, the specific gravity utilized to calculate the enthalpy relates directly to the particular stream or portion of a stream or the fluid at a tray which is referred to in the definitions given in equation (I). For example, to calculate HVTOP the temperature of the overhead flowing through conduit means 15 and the specific gravity of the overhead stream flowing through conduit means 15 is utilized in conjunction with a set of standard curves to derive the enthalpy of the overhead stream flowing through conduit means 15. This enthalpy may be corrected for pressure and UOPK using standard curves. It is presently preferred to program a digital computer to calculate the enthalpy based on the measured temperature, the known specific gravity and the standard curves.

The heat capacity of the pump around stream (CTPA) and the heat capacity of the external reflux flowing through conduit means 24 will both be known for any specific fractional distillation process. KCTR is derived by dividing the known heat capacity of the external reflux by the heat of vaporization of the external reflux (HVR).

The set point for the flow rate of the internal reflux in the upper portion of the fractional distillation column 11 is derived by utilizing a digital implementation of a proportional-integral-derivative controller to compare the actual 90 percent end point temperature of the light naphtha product, which is represented by signal 85, to the desired 90 percent end point temperature of the light naphtha product. The output of the digital implementation of a proportional-integral-derivative controller is the flow rate of the internal reflux in the upper portion of the fractional distillation column 11 which will make the actual 90 percent end point temperature of the light naphtha product substantially equal to the desired 90 percent end point temperature of the light naphtha product.

The set point (RITOPS) for the flow rate of the internal reflux in the upper portion of the fractional distillation column 11 is compared to the actual flow rate of the internal reflux as calculated in equation (I). From this comparison a determination is made as to whether the flow rate of the internal reflux needs to be increased or decreased.

If the flow rate of the internal reflux needs to be increased, the position of the pneumatic control valve 136 is first checked to determine if the pneumatic control valve 136 is either fully open or has reached a high limit. If the pneumatic control valve 136 can be opened more fully, then the set point for the flow rate of the internal reflux is substituted into equation (I) and equation (I) is solved to calculate a value for the flow rate of the pump around stream flowing through conduit means 31 which will make the actual flow rate of the internal reflux substantially equal to the desired flow rate. This is accomplished by solving for $F_{31}$ while using the measured or calculated values for the remaining parameters of equation (I) and utilizing RITOPS for RITOP in equation (I). The calculated required flow rate of the pump around stream flowing through conduit means 31 is provided as the output control signal 181 from computer means 100 and is utilized as has been previously described.

If it is desired to increase the internal reflux flow rate and the pneumatic control valve 136 cannot be opened more fully, then the valve position of the pneumatic control valve 116 is checked to determine if the pneumatic control valve 116 can be opened more fully. If the pneumatic control valve 116 can be opened more fully then equation (I) is solved for a value of $F_{24}$ which would increase the flow rate of the internal reflux to the desired flow rate. Again, RITOPS is substituted for RITOP in equation (I) and the remaining parameters of equation (I) are either measured or calculated. Signal 191 is provided from computer means 100 as the result of the calculation of the required flow rate of the external reflux flowing through conduit means 24. Signal 191 is utilized as has been previously described.

If it is desired to increase the flow rate of the internal reflux and the pneumatic control valve 116 cannot be opened more fully, then the valve position of the pneumatic control valve 163 is checked. If the pneumatic control valve 163 can be opened more fully to divert more of the pump around stream through the cooler 36 then equation (I) is solved for a value of $T_{33}$ which will increase the flow rate of the internal reflux to a desired value. Signal 201 is representative of the calculated temperature of the pump around stream flowing through conduit means 33 required to increase the flow rate of the internal reflux to a desired level.

If the comparison of the actual flow rate of the internal reflux to the desired flow rate of the internal reflux indicates that the flow rate of the internal reflux should be decreased then the procedure set forth in the foregoing paragraphs is reversed. Pneumatic control valve 163 will first be closed fully and then the pneumatic control valve 116 will be closed to its low limit if the opening of the pneumatic control valve 163 is not sufficient to produce the desired internal reflux flow rate. If the pneumatic control valve 116 is closed to its low limit and the internal reflux flow rate must still be decreased then the pneumatic control valve 136 will be closed more fully.

The essential feature of the priority control of the internal reflux flow rate is the maximizing of the flow rate of the pump around stream through conduit means 31 so as to substantially maximize the preheating of the feed stream flowing through conduit means 12. Preferably, second priority is given to manipulating the flow rate of the external reflux flowing through conduit means 24 and third priority is given to diverting a portion of the pump around stream through the cooler 36. The use of the cooler 36 is not required but is desirable in that a larger range of control of the flow rate of the internal reflux is provided by the ability to divert at least a portion of the pump around stream through the cooler 36.

A brief listing of a computer program which can be utilized to calculate the control signals required by the present invention is as follows. It is assumed that the parameters required in the various equations have been measured and provided to the computer or have been previously calculated in the manner described in the foregoing paragraphs. Terms not previously defined which are utilized in the following program listing are as follows:

V136=valve position of valve 136
V136HL=high limit for valve 136

V116=valve position of valve 116
V116HL=high limit for valve 116
V163=valve position of valve 163
V163LL=low limit for valve 163
V116LL=low limit for valve 116
F181=flow rate represented by signal 181
F191=flow rate represented by signal 191
T201=temperature represented by signal 201
F191HL=high limit for signal 191
F191LL=low limit for signal 191
F181HL=high limit for signal 140

---

BRIEF PROGRAM LISTING

```
     RITOP = F15*(HVTOP − HVT2)/HVT1
           + F31* CTPA/HVT1 * (T31-T33)
           + F24* HVR/HVT1 * (1 + KCTR*(T15-T24))
     IF(RITOPS.LT.RITOP) GO TO 25
     IF (V136.LT.V136HL) GO TO 30
     IF (V116.GE.V116HL) GO TO 50
     GO TO 45
25   IF (V163.GT.V163LL) GO TO 50
     IF (V116.GT.V116LL) GO TO 45
30   F181 = (RITOPS − F15*(HVTOP − HVT2)/HVT1
           − F24* HVR/HVT1* (1 + KCTR*(T15-T24)))
           /(CTPA/HVT1* (T31-T33)) GO TO 60
45   F191 = (RITOPS − F15* (HVTOP − HVT2)/HVT1
           − F31*CTPA/HTVI*(T31-T33))/

(HVR/HVT1*(1 + KCTR*(T15-T24))) GO TO 60
50   T201 = T31 − (RITOPS − F15*(HVTOP − HVT2)/HVT1
           − F24*HVR/HVT1*(1 + KCTR*(T15-T224)))
           /(F31* HVT1/CTPA)
60   IF (V116.LE.V116HL) GO TO 65
     F191 = F191HL
     GO TO 70
65   IF (V116.GE.V116LL) GO TO 70
     F191 = F191LL
70   IF (V136.LT.V136HL) GO TO 80
     F181 = F181HL
80   END
```

---

The invention has been described in terms of a preferred embodiment as illustrated in FIG. 1. Specific components used in the practice of the invention as illustrated in FIG. 1 such as flow sensors 57, 67, 102 and 122; flow transducers 56, 66, 101 and 121; temperature transducers 51, 91, 142 and 151; flow controllers 108 and 128; temperature controller 154; pneumatic control valves 136, 163 and 116; current to pressure transducers 185, 194 and 207; pressure to current transducers 129, 137, 59, 69, 109, 117 and 165 are each well known, commercially available control components such as are described at length in Perry's Chemical Engineers Handbook, 4th Edition, Chapter 22, McGraw-Hill.

A suitable analyzer for determining the 90 percent end point of the light naphtha product is the TOTCO Boiling Point Analyzer manufactured by TOTCO, Glendale Calif.

A suitable A/D converter is the MM5357 eight bit A/D converter manufactured by National Semiconductor Corporation, Santa Clara, Calif. A suitable D/A converter is the AD559 eight bit D/A converter manufactured by Analog Devices, Norwood, Mass.

While the invention has been described in terms of the presently preferred embodiment, reasonable variations and modifications are possible by those skilled in the art, within the scope of the described invention and the appended claims.

That which is claimed is:

1. Apparatus comprising:
a fractional distillation column means;
a first heat exchanger means;
means for supplying a feed stream through said first heat exchanger means to said fractional distillation column means;
means for withdrawing a pump around stream from a first upper portion of said fractional distillation column means and for passing said pump around stream through said first heat exchange means to a second upper portion of said fractional distillation column means, wherein said second upper portion is above said first upper portion;
a first cooling means;
an overhead accumulator means;
means for withdrawing an overhead vapor stream from an upper portion of said fractional distillation column means and for passing said overhead vapor stream through said first cooling means to said overhead accumulator means;
means for withdrawing a liquid stream from said overhead accumulator means, for returning the first portion of the thus withdrawn liquid stream to a third upper portion of said fractional distillation column means as an upper external reflux, and for removing a second portion of the thus withdrawn liquid stream as a product stream, wherein said third upper portion is above said first upper portion;
means for manipulating the flow rate of said pump around stream;
means for manipulating the flow rate of said upper external reflux;
means for calculating a first signal representative of the actual flow rate of the internal reflux in an upper portion of said fractional distillation column means;
means for calculating a second signal representative of the flow rate of the internal reflux in the upper portion of said fractional distillation column means required to maintain a desired product specification for said product stream;
means for comparing said first signal and said second signal to thereby determine if the internal reflux flow rate in the upper portion of said fractional distillation column means should be increased or decreased;
means for determining if the flow rate of said pump around stream can be increased;
means for determining if the flow rate of said upper external reflux can be decreased;
means for calculating a third signal representative of the flow rate of said pump around stream required to make said first signal substantially equal to said second signal;
means for establishing a fourth signal representative of the highest desired flow rate of said pump around stream;
means for establishing a fifth signal representative of the flow rate of said upper external reflux required to make said first signal substantially equal to said second signal; and
means for establishing a sixth signal representative of the lowest desired flow rate of said upper external reflux, wherein the flow rate of said pump around stream is manipulated in response to said third signal and the flow rate of said upper external reflux is manipulated in response to said sixth signal if it is desired to increase the flow rate of said internal reflux and it is determined that the flow rate of said pump around stream can be increased or if it is desired to decrease the flow rate of said internal reflux and it is determined that the flow rate of said upper external reflux cannot be decreased, and wherein the flow rate of said pump around stream is manipulated in response to said fourth signal and the flow rate of said upper external reflux is manipulated in response to said fifth signal if it is desired to increase the flow rate of said internal reflux and it is determined that the flow rate of said pump around stream cannot be increased, or if it is desired to decrease the flow rate of said internal reflux and it is determined that the flow rate of said upper external reflux can be decreased.

2. Apparatus in accordance with claim 1 wherein said means for calculating said second signal comprises:

means for measuring an actual end point temperature of said product stream and for establishing a seventh signal representative thereof;

means for establishing an eighth signal representative of the desired end point temperature of said product stream; and means for comparing said seventh signal and said eighth signal and for establishing said second signal responsive to the difference between said seventh signal and said eighth signal.

3. Apparatus in accordance with claim 2 additionally comprising:

second cooling means;

means for diverting said pump around stream through said second cooling means;

means for manipulating the diversion of said pump around stream through said second cooling means;

means for determining if the flow rate of said upper external reflux can be increased;

means for determining if the amount of said pump around stream, if any, being diverted through said second cooling means can be decreased;

means for calculating a ninth signal representative of the temperature of said pump around stream returning to said fractional distillation column required to make said first signal substantially equal to said second signal; and means for establishing a tenth signal representative of the lowest desired diversion of said pump around stream through said second cooling means, wherein the diversion of said pump around stream through said second cooling means is manipulated in response to said ninth signal if it is desired to increase the flow rate of said internal reflux and it is determined that the flow rate of said upper external reflux cannot be increased or if it is desired to decrease the flow rate of said internal reflux and it is determined that the amount of said pump around stream being diverted through said second cooling means can be decreased, and wherein the diversion of said pump around stream through said second cooling means is manipulated in response to said tenth signal if it is desired to increase the flow rate of said internal reflux and it is determined that the flow rate of said upper external reflux can be increased or if it is desired to decrease the flow rate of said internal reflux and it is determined that the amount of said pump around stream being diverted through said second cooling means cannot be decreased.

* * * * *